United States Patent
Schlüssel (10) Patent No.: US 11,638,986 B2
(45) Date of Patent: May 2, 2023

(54) CLAMPING JAW FOR CLAMPING OF A WORKPIECE

(71) Applicant: GRESSEL AG, Aadorf (CH)

(72) Inventor: Marcel Schlüssel, Bassersdorf (CH)

(73) Assignee: GRESSEL AG, Aadorf (CH)

( * ) Notice: Subject to any disclaimer, the term of this patent is extended or adjusted under 35 U.S.C. 154(b) by 134 days.

(21) Appl. No.: 16/752,741

(22) Filed: Jan. 27, 2020

(65) Prior Publication Data

US 2020/0238479 A1 Jul. 30, 2020

(30) Foreign Application Priority Data

Jan. 29, 2019 (DE) .................... 10 2019 102 167.7

(51) Int. Cl.
  *B25B 1/24* (2006.01)
  *B25B 5/16* (2006.01)
  *B23Q 3/10* (2006.01)

(52) U.S. Cl.
  CPC .............. *B25B 5/163* (2013.01); *B23Q 3/103* (2013.01); *B25B 1/241* (2013.01); *B25B 1/2452* (2013.01); *B25B 1/2457* (2013.01); *B25B 1/2473* (2013.01)

(58) Field of Classification Search
  CPC ..... B25B 1/241; B25B 1/2405; B25B 1/2452; B25B 1/2457; B25B 5/163; B25B 1/2473; B25B 1/103; B25B 1/2489; B25B 5/10; B23Q 3/103
  USPC ........................................ 269/136, 282, 137
  See application file for complete search history.

(56) References Cited

U.S. PATENT DOCUMENTS

| | | | | |
|---|---|---|---|---|
| 824,394 A | * | 6/1906 | Warner ...................... | B25B 1/10 269/137 |
| 1,397,409 A | * | 11/1921 | Walter ................... | B25B 1/2415 269/267 |
| 6,149,146 A | * | 11/2000 | Pleban ...................... | B25B 5/10 269/201 |
| 9,296,090 B2 | | 3/2016 | Bronzino | |
| 2002/0050673 A1 | * | 5/2002 | Collins ................. | B25B 1/2452 269/282 |
| 2002/0109282 A1 | * | 8/2002 | Peck ...................... | B25B 1/2442 269/258 |
| 2008/0315480 A1 | * | 12/2008 | Iacobelli ................. | B25B 5/163 269/277 |

(Continued)

FOREIGN PATENT DOCUMENTS

AT 288283 B 2/1971
DE 202014006137 * 9/2014

(Continued)

OTHER PUBLICATIONS

Result of examination report for German Patent Application No. 10 2019 102 167.7 filed Jan. 29, 2019.

*Primary Examiner* — Mahdi H Nejad (74) *Attorney, Agent, or Firm* — Paul D. Bianco; Fleit Intellectual Property Law (57) ABSTRACT

A clamping jaw for the clamping of a workpiece, with a body and several clamping inserts arranged in mounting openings of the body made of a sintered material. The clamping inserts are designed in the form of cylindrical pins projecting relative to an end surface of the body and inclined relative to a lower base surface of the body with a clamping edge for forcing the clamping inserts into the workpiece.

22 Claims, 5 Drawing Sheets

(56) References Cited

U.S. PATENT DOCUMENTS

| | | | | |
|---|---|---|---|---|
| 2011/0272537 A1* | 11/2011 | Gindy | ................... | B25B 1/2457 |
| | | | | 248/201 |
| 2011/0291342 A1* | 12/2011 | Gindy | ................... | B25B 1/2421 |
| | | | | 269/266 |
| 2014/0117606 A1* | 5/2014 | Bronzino | ................ | B25B 1/241 |
| | | | | 269/265 |
| 2016/0089767 A1* | 3/2016 | Zaehnle | ................. | B25B 1/241 |
| | | | | 29/428 |

FOREIGN PATENT DOCUMENTS

| | | | |
|---|---|---|---|
| DE | 202014006137 U1 * | 9/2014 | |
| DE | 102019104836 A1 * | 8/2020 | |
| EP | 0761382 A1 | 3/1997 | |
| EP | 1375069 A2 | 1/2004 | |
| EP | 2724817 A1 | 4/2014 | |

* cited by examiner

CLAMPING JAW FOR CLAMPING OF A WORKPIECE

FIELD OF THE DISCLOSURE

The disclosure relates to a clamping jaw with a body and several clamping inserts arranged in mounting openings of the body made of a sintered material.

BACKGROUND

Such a clamping jaw is known from EP 2 724 817 A1. Several triangular recesses are made in the clamping surface of a body facing the workpiece, into each of which a triangular clamping insert made of sintered solid carbide material is inserted. However, both production of the body and production of the clamping inserts in such a clamping jaw are relatively demanding and therefore associated with the corresponding costs. Such triangular clamping inserts also require relatively large design space in depth so that the lateral accessibility can be restricted.

A device for fixing the positions of parts in holding devices with a body and alignment pins arranged therein is known from EP 0 761 382 A1. The alignment pins are inserted into holes at right angles to a clamping surface of the body.

Several individually adjustable retaining screws for support against a workpiece are arranged in threaded holes of the clamping jaw in a clamping device known from U.S. Pat. No. 824,394 A.

EP 1 375 069 A2 concerns a clamping device that contains a movable clamping element designed as a cylinder and a fixed clamping element. The fixed clamping element contains a housing having two blind holes leading obliquely downward arranged one above the other on the workpiece side. A clamping jaw outwardly biased by a compression spring is inserted into each of the blind holes.

A device for straight clamping of preferably cylindrical workpieces of the same diameter between clamping jaws movable parallel to each other is disclosed in AT 288 283 B. For this purpose, at least one clamping jaw has notch-like clamping elements in a straight line arranged in series.

SUMMARY

One aspect of the disclosure relates to a clamping jaw which facilities an optimal clamping effect, is favorable to manufacture, and permits improved accessibility even at limited clamping heights. Expedient embodiments and advantageous refinements are also disclosed.

The clamping inserts in the clamping jaw according to the disclosure are designed in the form of cylindrical pins projecting relative to an end surface of the body and inclined with respect to a lower base surface of the body, forming a clamping edge for insertion of the clamping inserts into the workpiece. A wedge-like clamping profile with upper and lower embossed surfaces is thereby formed, which are pressed into the workpiece and ensure good holding. Because of the oblique arrangement of the pin-like clamping inserts, they are only loaded in the pressure direction and exhibit no or only limited bending load. The clamping inserts designed as cylindrical pins have a simple geometry and are thus simple to manufacture. Their mounting in a body is also simple and possible with little effort. The clamping inserts, for example, can be inserted into holes in the body that are simple to produce and cost-effective. The clamping inserts consisting of sintered metal or sintered ceramic can have a hardness of up to HRC 90, so that even workpieces made of hardened steel can be reliably clamped. The cost-effective clamping inserts are simple to mount and can be replaced quickly and simply, as required.

In a particularly expedient embodiment, the center axes of the clamping inserts designed as cylindrical pins are inclined at an angle of 40 to 60° with respect to the base surface of the body. If the center axes of the clamping inserts designed as cylindrical pins are inclined at an angle of 45°, for example, with respect to the base surface of the body, almost identical upper and lower embossed surfaces are obtained so that a neutral clamping engagement is obtained without pull-down. At angles of more than 45°, downward acting force components can be generated on the clamping insert through which the workpieces can be forced downward against a support surface.

The clamping inserts designed as cylindrical pins are preferably arranged in several oblique mounting openings arranged next to each other on the end surface of the body. The mounting openings can be designed as simple cylindrical holes and are thus simple to manufacture.

Particularly reliable holding of the clamping inserts on the body can be achieved by the fact that the clamping inserts are fastened by gluing, soldering, pressing, clamping or the like into the mounting openings of the body. In one possible embodiment, the clamping inserts can be held against the body by a notch pressed into the body.

The mounting openings can be expediently designed as blind holes. However, ejection holes can also be provided on the mounting openings. Because of this, the clamping inserts, when necessary, can be simply changed or replaced.

A particularly sharp clamping edge can be achieved by the fact that clamping inserts designed as cylindrical pins have a flat outer end surface. The outer end surface of the pin-like clamping inserts, however, can also be slightly conical or curved.

For clamping with low clamping height, a contact surface for support of the workpiece can be provided on the body beneath the clamping inserts. For clamping of larger workpieces, however, such a contact surface can also be omitted. The end surface can then run at right angles to the base surface without gradation.

In another expedient embodiment, the pin-like clamping inserts can be arranged in a concave plane, so that the outer clamping inserts engage deeper into the workpiece than the inner clamping inserts. The tilting moments that develop during the clamping process can thereby be optimally taken up by the outer clamping inserts. The clamping inserts, however, can also be arranged in a straight plane.

The clamping inserts can be arranged in one row or several rows.

BRIEF DESCRIPTION OF THE DRAWINGS

Additional details and advantages of the disclosure are apparent from the following description of preferred embodiment examples with reference to the drawing. In the drawing.

DETAILED DESCRIPTION

Figure 4:
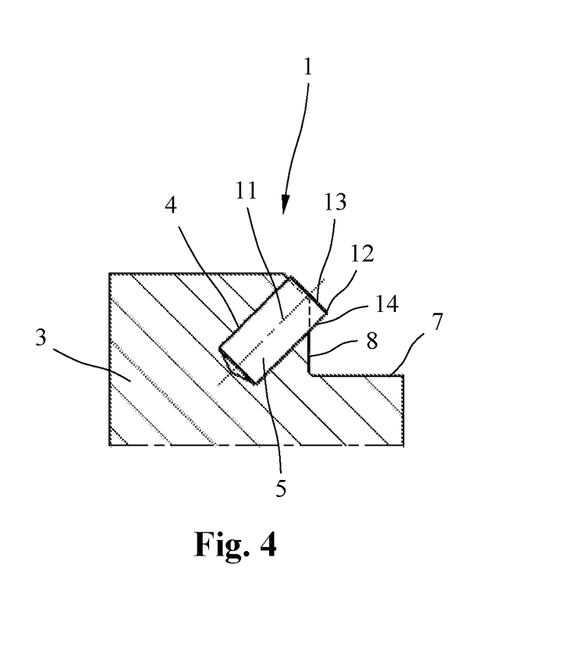
FIG. 4 shows an enlarged depiction of the upper area of the view of FIG. 3.
Figure 5:
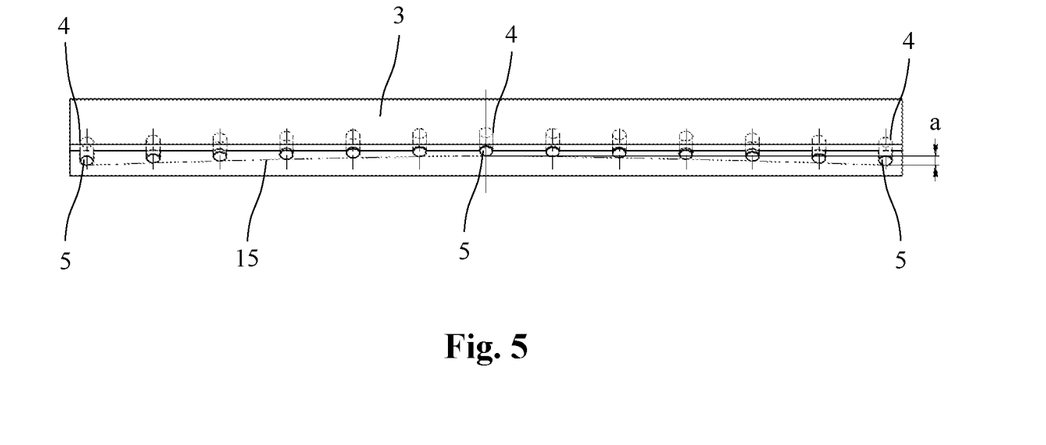
FIG. 5 shows the clamping jaw of FIG. 1 in a top view.
Figure 6:
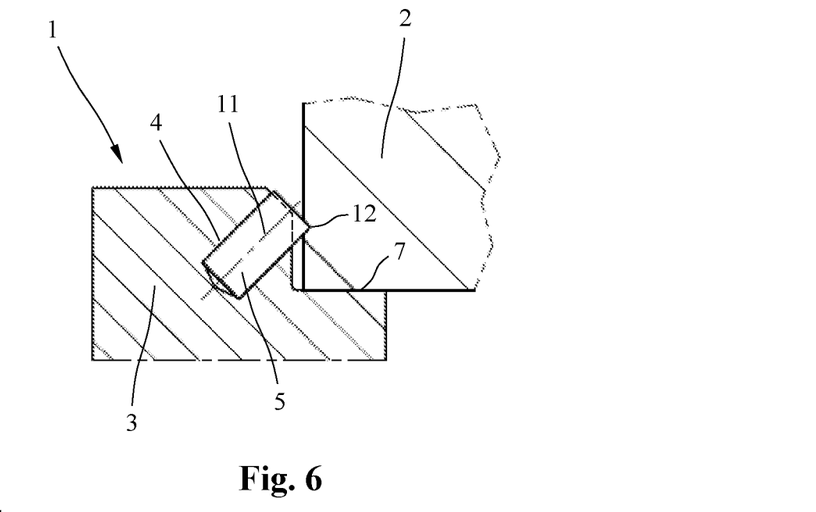
FIG. 6 shows the detail view depicted in FIG. 4 of a clamping jaw with workpiece.

A first embodiment example of a clamping jaw 1 is shown in FIGS. 1 to 7 for the clamping of a workpiece 2 depicted in FIG. 6. The clamping jaw 1 contains a body 3 and several pin-like clamping inserts 5 arranged in mounting openings 4 of the body 3, which consists of a sintered material, preferably sintered metal or sintered ceramic.

The body 3 of clamping jaw 1 has a lower base surface 6 on its bottom running in the clamping direction of clamping jaw 1 and a step-like shoulder on its side facing the workpiece 2 with a support surface 7 parallel to base surface 6, an end surface 8 at a right angle to it and a chamfer 9. Several oblique mounting openings 4 arranged next to each other are provided on the step-like shoulder of the body 3 to accommodate the clamping inserts 5 designed in the form of cylindrical pins. The clamping jaw 1 in the embodiment depicted in FIGS. 1 to 7 is designed as a replaceable clamping jaw. The body 3 is therefore designed in the form of a plate and has two holes 10 depicted in FIG. 1 for fastening screws for releasable fastening of the clamping jaw 1 to the oppositely movable jaws of a vice or other clamping device. However, the body 3 can also be screwed from above or designed as the jaw of a vice, for example, in the form of a block or the like.

Figure 1:
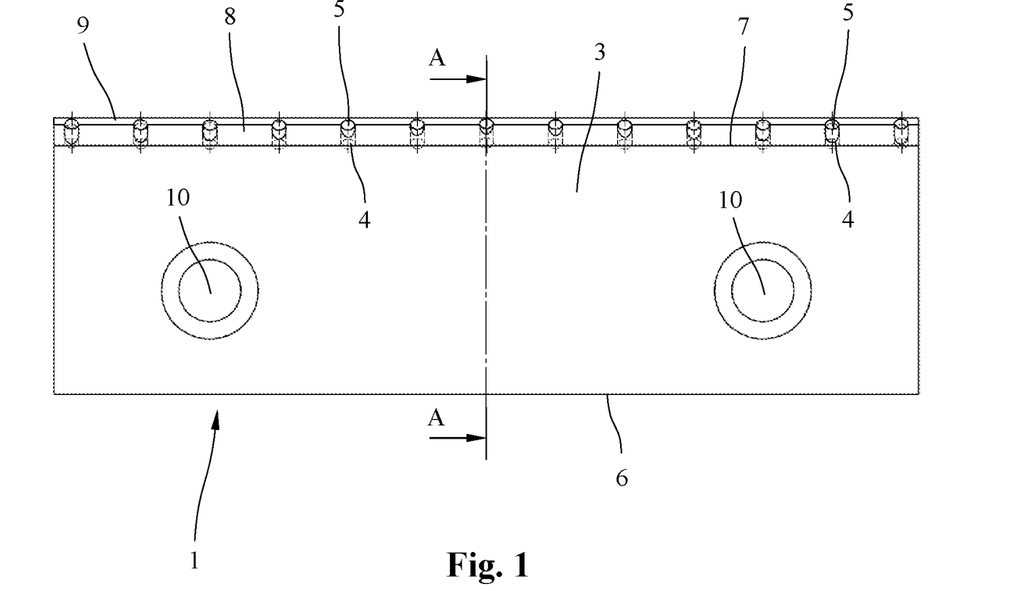
FIG. 1 shows a first embodiment example of a clamping jaw in a front view.
Figure 2:
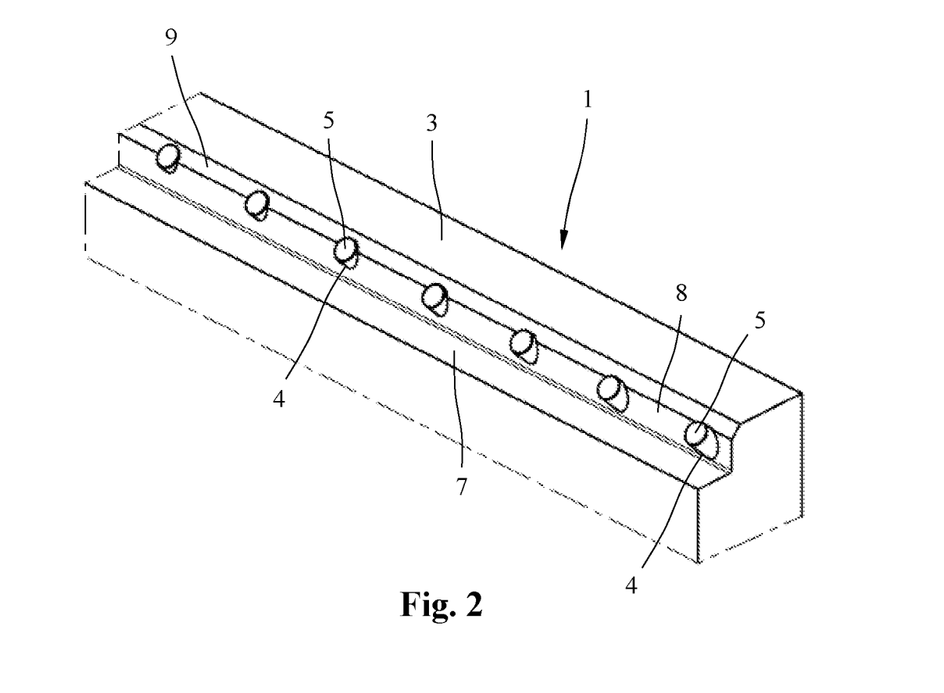
FIG. 2 shows the upper part of the clamping jaw depicted in FIG. 1 in a perspective.
Figure 3:
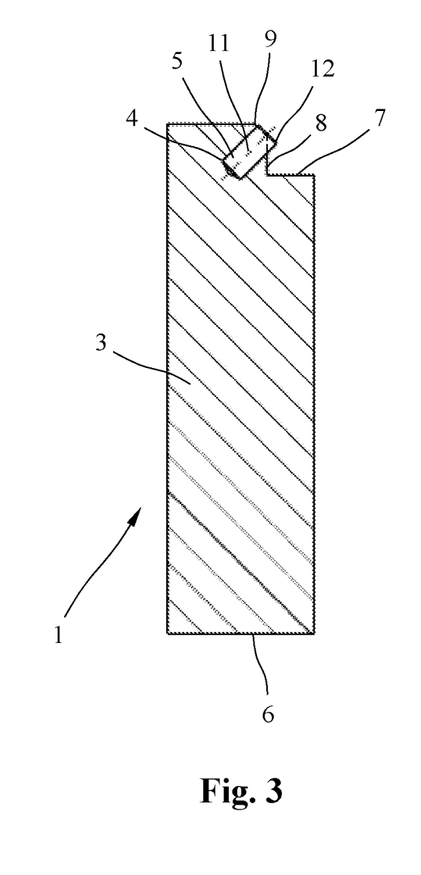
FIG. 3 shows a sectional view of the clamping jaw along line A-A of FIG. 1.

As follows from FIGS. 3 and 4, the clamping inserts 5 designed as cylindrical pins are arranged in the body 3, so that their central axis 11 runs obliquely toward the front end surface 8 of body 3 and also obliquely toward the lower base 6. The hole-like mounting openings 4 designed as holes for the pin-like clamping inserts 5 projecting obliquely upward here are inclined obliquely downward relative to the front end surface 8. The pin-like clamping inserts 5 have an edge 12 on their ends projecting opposite end surface 8 for insertion into the workpiece. The edge 12 in the embodiment depicted in FIG. 4 is formed between a flat outer end surface 13 and the lateral surface 14 of the pin-like clamping insert 5. A particularly sharp edge 12 for good cutting into the workpiece 2 is achieved by a flat outer end surface 13. The outer end surface 13 of the pin-like clamping inserts 5, however, can also be slightly conical or curved.

It is apparent in the top view of the FIG. 5 that the pin-like clamping inserts 5 are not arranged in a straight, but in a concave plane 15 so that the outer clamping inserts 5 engage more deeply into the workpiece than the inner clamping inserts 5. Because of this the tilting moments that develop during the clamping process are optimally taken up by the outer clamping inserts 5. A distance a is present between the inner clamping insert 5 and the corresponding outer clamping inserts 5. This can be achieved, for example, by different alignments and differently projecting clamping inserts 5. The clamping inserts 5, however, can also be arranged in a straight plane.

Figure 7:
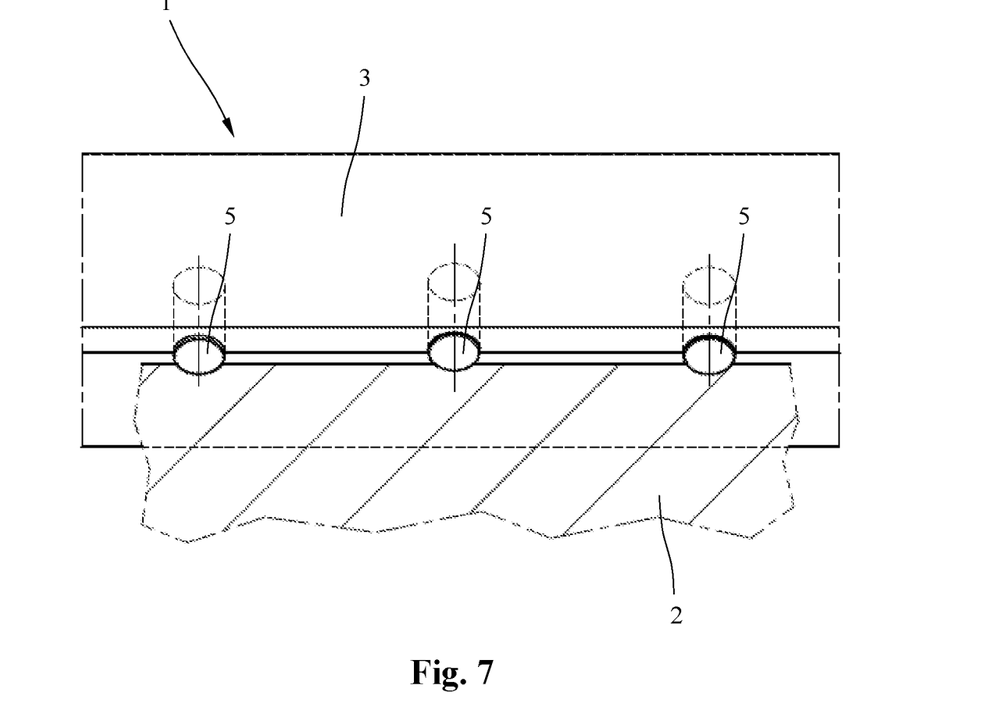
FIG. 7 shows a top view of the clamping jaw of FIG. 1 with workpiece.

As is apparent from FIGS. 6 and 7, the pin-like clamping inserts 5 are forced against the workpiece 2 in the fashion of a wedge into the surface of workpiece 2 during travel of the clamping jaw 1. Proper grip of the clamping jaw 1 and reliable holding of the workpiece 2 are thereby achieved.

The central axes 11 of the pin-like clamping inserts 5 in the embodiment depicted in FIGS. 1 to 7 have an inclination of 45° relative to the base surface 6 and to the clamping direction of clamping jaw 1. The embossed surfaces formed by the outer end surface 13 and the lateral surface 14 of pin-like clamping insert 5 therefore have the same inclination, so that neutral clamping without pull-down can be achieved. At greater inclinations of the central axes 11, on the other hand, the lower embossed surface is larger than the upper embossed surface. The workpiece is thereby pulled downward against the support surface 7 when the clamping inserts 5 are forced downward. In preferred fashion, the central axes 11 of the pin-like clamping inserts 5 are inclined at an angle of 45° to 60° relative to the base surface 6 of the body 3 and the clamping direction of the clamping jaw 1. A support surface 7 provided on the body 3 beneath clamping inserts 5 is particularly suitable for support of workpieces that do not protrude too far. However, for clamping of larger workpieces such a support surface can also be omitted. The end surface 8 can then run at right angles to the base surface 6 without gradation. In order for low clamping heights to also be clamped, the pin-like clamping inserts 5 designed as cylindrical pins preferably have a small diameter of 0.5 to 5 mm, preferably about 2 mm.

Figure 8:
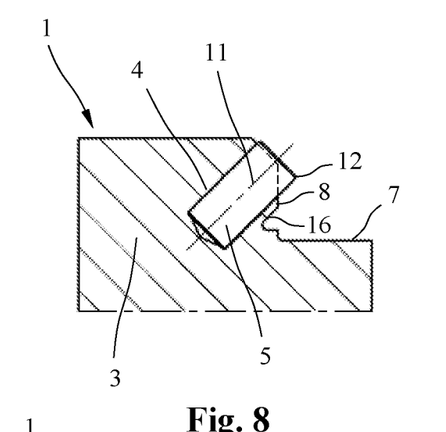
FIG. 8 shows a detailed view of a second embodiment of a clamping jaw.

Fastening of the pin-like clamping inserts 5 in the mounting openings 4 of the body 3 can occur by gluing, pressing, soldering or another appropriate manner. In an advantageous embodiment, the clamping inserts 5 can be designed so that they are force-fit by deformation of the body 3, for example, by introducing a notch 16 depicted in FIG. 8 or a hole.

Figure 9:
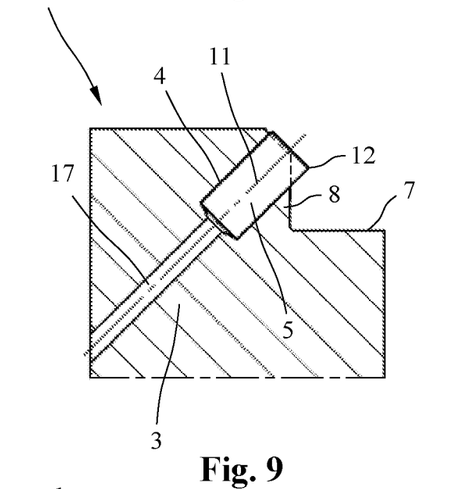
FIG. 9 shows a detailed view of a third embodiment of a clamping jaw.

In order to facilitate changing of clamping inserts 5, an ejection hole 17 depicted in FIG. 9 can be provided in the body 3. If necessary, a clamping insert 5 can be simply ejected and replaced via the ejection hole 17 coaxial to mounting opening 4.

Figure 10:
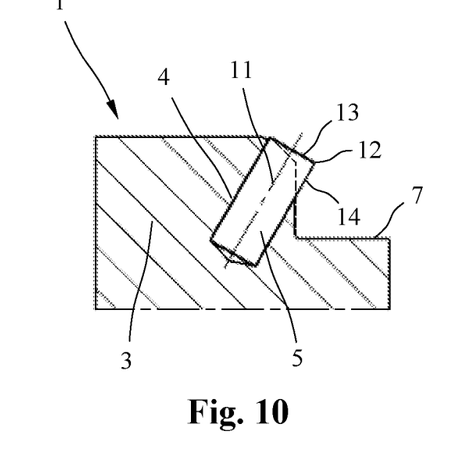
FIG. 10 shows a detailed view of a fourth embodiment of a clamping jaw.

An embodiment example of a clamping jaw 1 with a body 3 and a pin-like clamping insert 5, whose central axis 11 is inclined at an angle of 60° relative to the base surface 7, is depicted in FIG. 10. It is apparent from this depiction that the upper embossed surface formed by the outer end surface 13 of clamping insert 5 is smaller than the lower embossed surface formed by the lateral surface 14 of the clamping insert 5.

Figure 11:
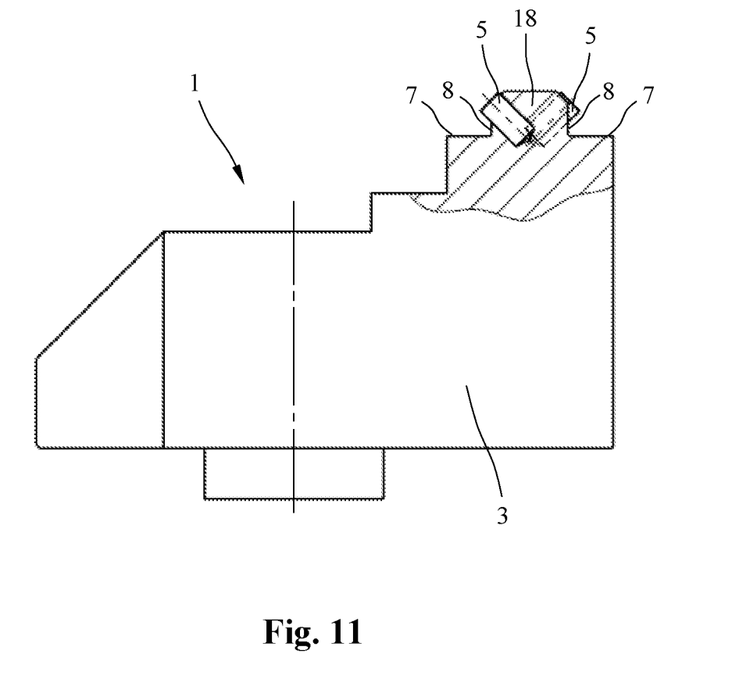
FIG. 11 shows a fifth embodiment example of clamping jaw in a side view.
Figure 12:
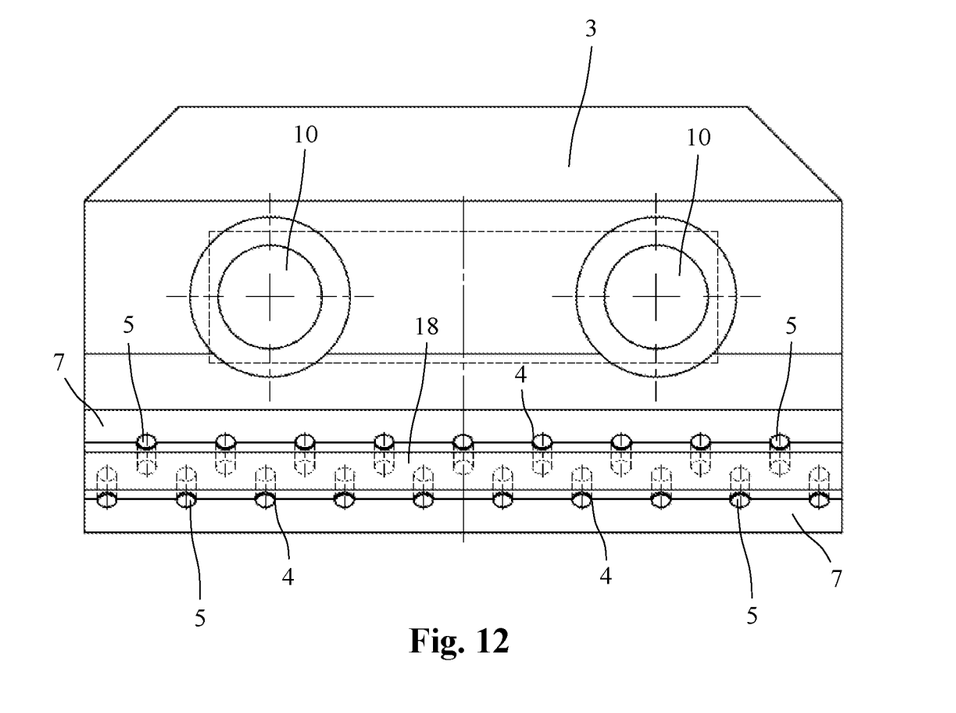
FIG. 12 shows the clamping jaw of FIG. 11 in a top view.

FIGS. 11 and 12 show another embodiment example of a clamping jaw 1 with a body 3 and several pin-like clamping inserts 5 arranged in mounting openings 4 of the body 3. In contrast to the previous embodiments, the body 3 here is not designed as a replaceable plate, but as a clamping block that can be fastened on a guide part. The body 3, as required, can be turned around and has an upward projecting crosspiece 18 with two end surfaces 8 pointing toward opposite sides. Obliquely upwardly projecting pin-like clamping inserts 5 are provided on the crosspiece 18 projecting toward both sides. The clamping inserts 5 arranged on both end surfaces 8 are offset here relative to each other.

LIST OF REFERENCE NUMBERS

1 Clamping jaw
2 Workpiece
3 Body
4 Mounting opening

5 Clamping insert
6 Lower base surface
7 Support surface
8 End surface
9 Chamfer
10 Hole
11 Central axis
12 Edge
13 End surface
14 Lateral surface
15 Concave plane
16 Notch
17 Ejection hole
18 Crosspiece

The invention claimed is:

1. A clamping jaw for clamping of a workpiece, the clamping jaw comprising:
a body having a lower base surface; and
a plurality of clamping inserts arranged in mounting openings of the body,
wherein the lower base surface is beneath the clamping inserts,
the clamping inserts are cylindrical pins projecting relative to an end surface of the body and inclined upward relative to the lower base surface of the body with a clamping edge for forcing the clamping inserts into the workpiece,
each of the clamping inserts is cylindrical pin-shaped so as to have a curved lateral surface, the clamping edge being formed between the curved lateral surface and an outer end surface of the clamping insert,
the clamping inserts project obliquely upward and away from the lower base surface of the body, and
a support surface is provided on the body beneath the clamping inserts for supporting the workpiece against gravity, the support surface being parallel to the lower base surface of the body.

2. The clamping jaw of claim 1, wherein center axes of the clamping inserts are inclined upward at an angle of 40° to 60° with respect to the lower base surface of the body.

3. The clamping jaw of claim 1, wherein each of the mounting openings is oblique and the mounting openings are arranged next to each other on the end surface of the body.

4. The clamping jaw of claim 1, wherein the clamping inserts are fastened by gluing or soldering in the mounting openings of the body.

5. The clamping jaw of claim 1, wherein the clamping inserts are held against the body by a notch made in the body.

6. The clamping jaw of claim 1, wherein the mounting openings are oblique blind holes.

7. The clamping jaw of claim 1, wherein an ejection hole is provided on each of the mounting openings.

8. The clamping jaw of claim 1, wherein the clamping inserts are not arranged in a straight line, the clamping inserts being arranged in a concave plane so that the outer clamping inserts engage more deeply into the workpiece than the inner clamping inserts.

9. The clamping jaw of claim 1, wherein the clamping inserts are arranged in a plurality of rows.

10. The clamping jaw of claim 1,
wherein the clamping inserts are arranged in one row, and
the clamping inserts in the row are not arranged in a straight line, the clamping inserts in the row being arranged in a concave plane.

11. The clamping jaw of claim 1,
wherein the clamping inserts are arranged in a plurality of rows, and
the clamping inserts in at least one of the rows are not arranged in a straight line, the clamping inserts in the at least one row being arranged in a concave plane.

12. The clamping jaw of claim 1, wherein the clamping inserts are arranged in one row.

13. The clamping jaw of claim 1, wherein the support surface is above the lower base surface.

14. The clamping jaw of claim 1, wherein the clamping inserts are inclined at an angle that forces the workpiece downward against the support surface.

15. The clamping jaw of claim 1, wherein the clamping inserts are made of a sintered material.

16. An apparatus comprising:
a clamping device; and
the clamping jaw of claim 1, the clamping jaw being attached to the clamping device for clamping of the workpiece,
wherein the body of the clamping jaw has a side surface having at least one hole for attaching the clamping jaw to the clamping device.

17. The clamping jaw of claim 1, wherein the outer end surface of each of the clamping inserts is flat.

18. The clamping jaw of claim 1, wherein the outer end surface of each of the clamping inserts is slightly conical or curved.

19. A clamping jaw for clamping of a workpiece, the clamping jaw comprising:
a body having a lower base surface; and
a plurality of clamping inserts arranged in mounting openings of the body,
wherein the lower base surface is beneath the clamping inserts,
the clamping inserts are cylindrical pins projecting relative to an end surface of the body and inclined upward relative to the lower base surface of the body with a clamping edge for forcing the clamping inserts into the workpiece,
the clamping inserts project obliquely upward and away from the lower base surface of the body,
a support surface is provided on the body beneath the clamping inserts for supporting the workpiece against gravity, the support surface being parallel to the lower base surface of the body, and
each of the plurality of clamping inserts has an outer end surface that is flat such that the flat outer end surface is at a right angle to a lateral surface of the clamping insert, the clamping edge being formed between the flat outer end surface and the lateral surface of the clamping insert.

20. A clamping jaw for clamping of a workpiece, the clamping jaw comprising:
a body having a lower base surface; and
a plurality of clamping inserts arranged in mounting openings of the body,
wherein the lower base surface is beneath the clamping inserts,
the clamping inserts are cylindrical pins projecting relative to an end surface of the body and inclined upward relative to the lower base surface of the body with a clamping edge for forcing the clamping inserts into the workpiece,
each of the clamping inserts is cylindrical pin-shaped so as to have a curved lateral surface, the clamping edge being formed between the curved lateral surface and an outer end surface of the clamping insert, the clamping inserts project obliquely upward and away from the lower base surface of the body, the body includes a support surface to support the workpiece, the support surface is beneath the clamping inserts, and the clamping inserts project obliquely upward and away from the support surface of the body.

21. The clamping jaw of claim 20, wherein the clamping inserts are made of a sintered material.

22. The clamping jaw of claim 20, wherein the clamping inserts are inclined at an angle that forces the workpiece downward against the support surface.

* * * * *